Dec. 1, 1970 R. H. MURRAY 3,543,417
FILMED PROGRAMMED TEACHING MACHINES AND THE LIKE
Filed March 8, 1968 7 Sheets-Sheet 1

INVENTOR
Robert H. Murray

BY
ATTORNEYS

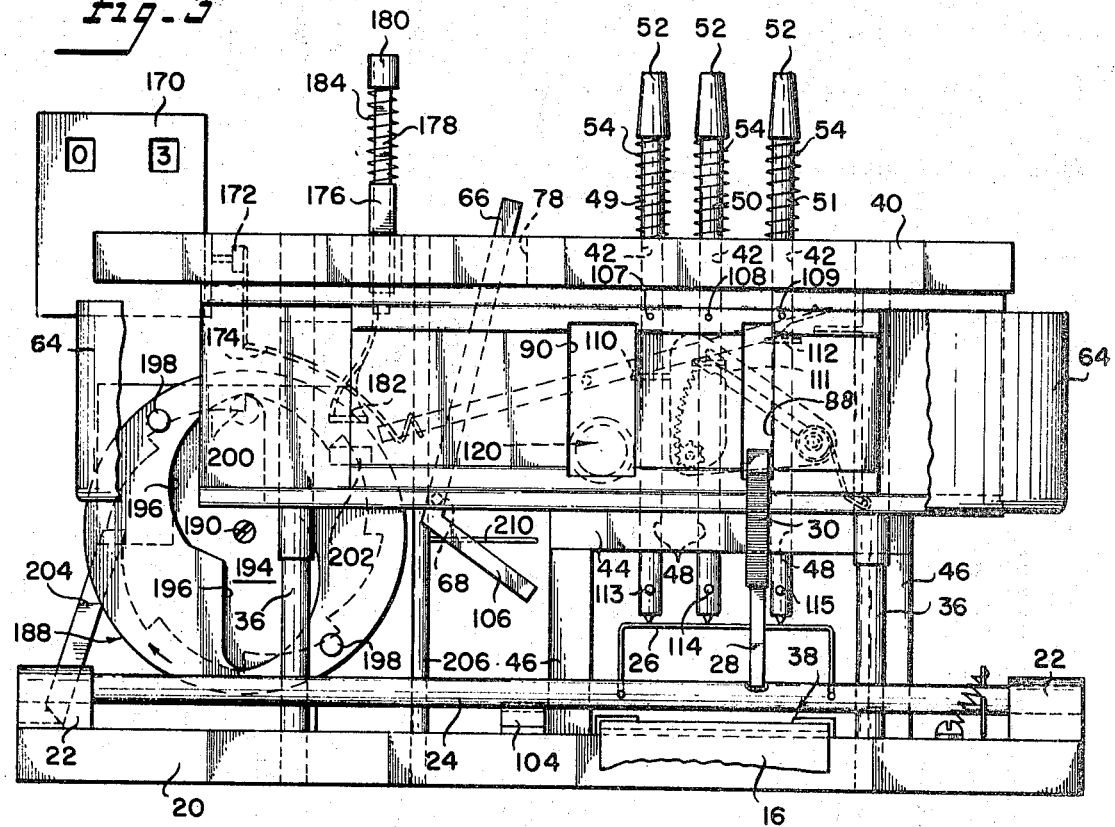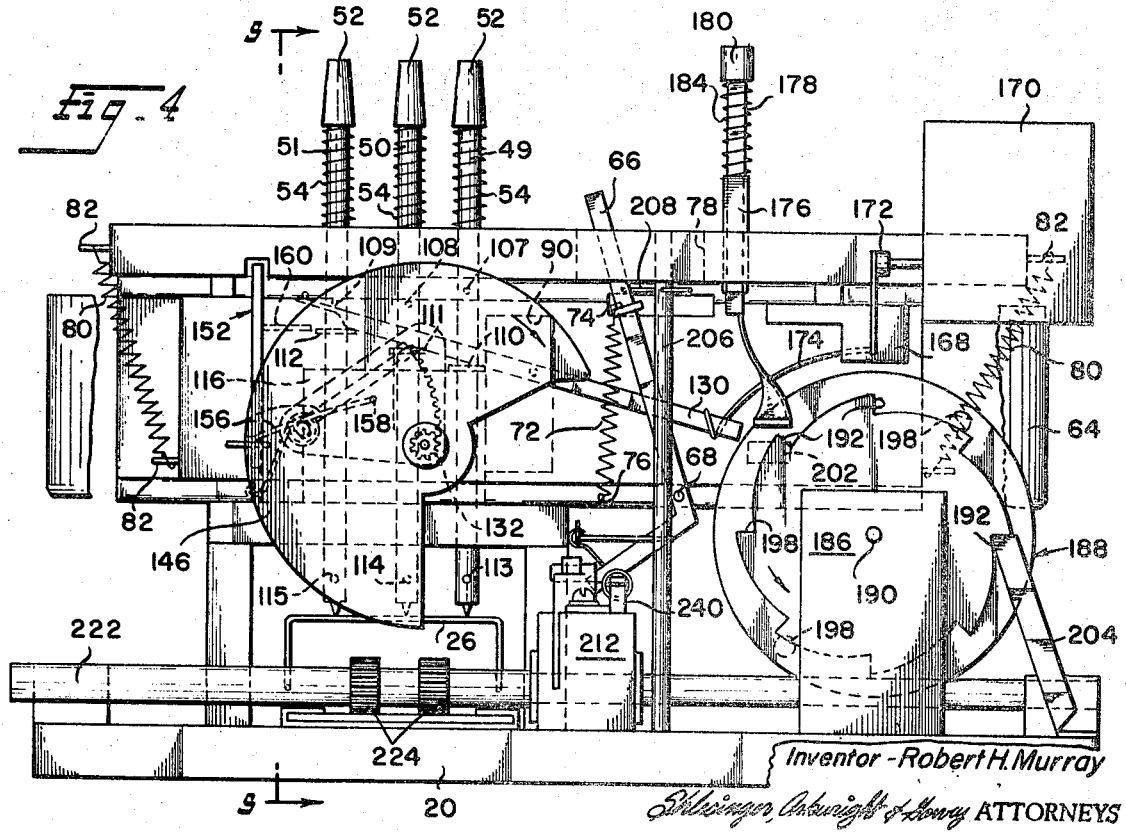

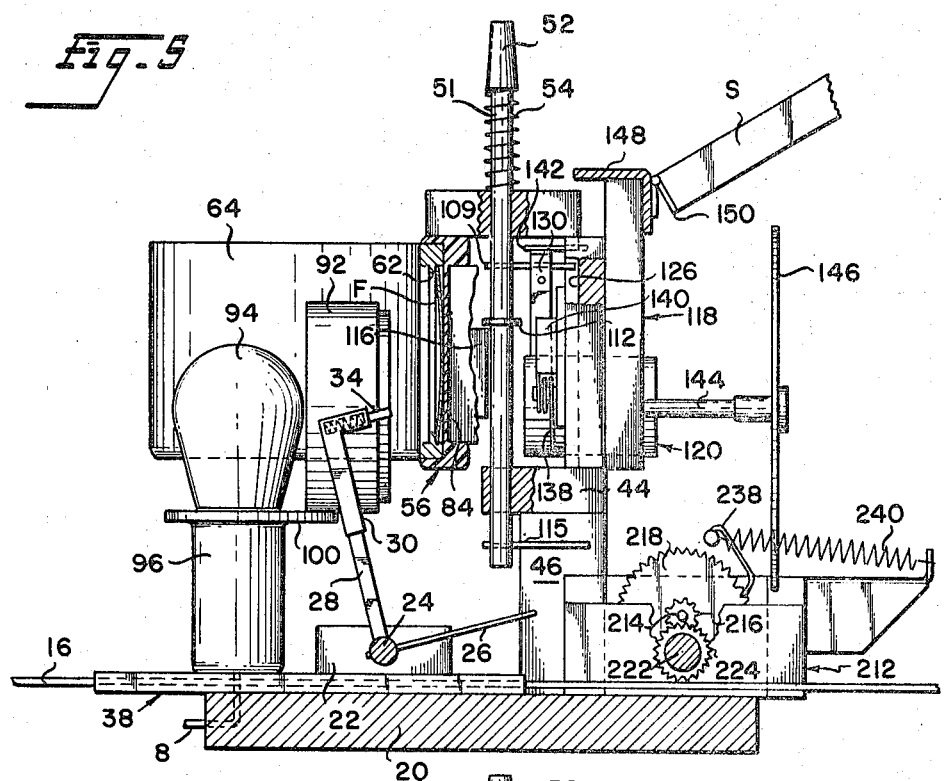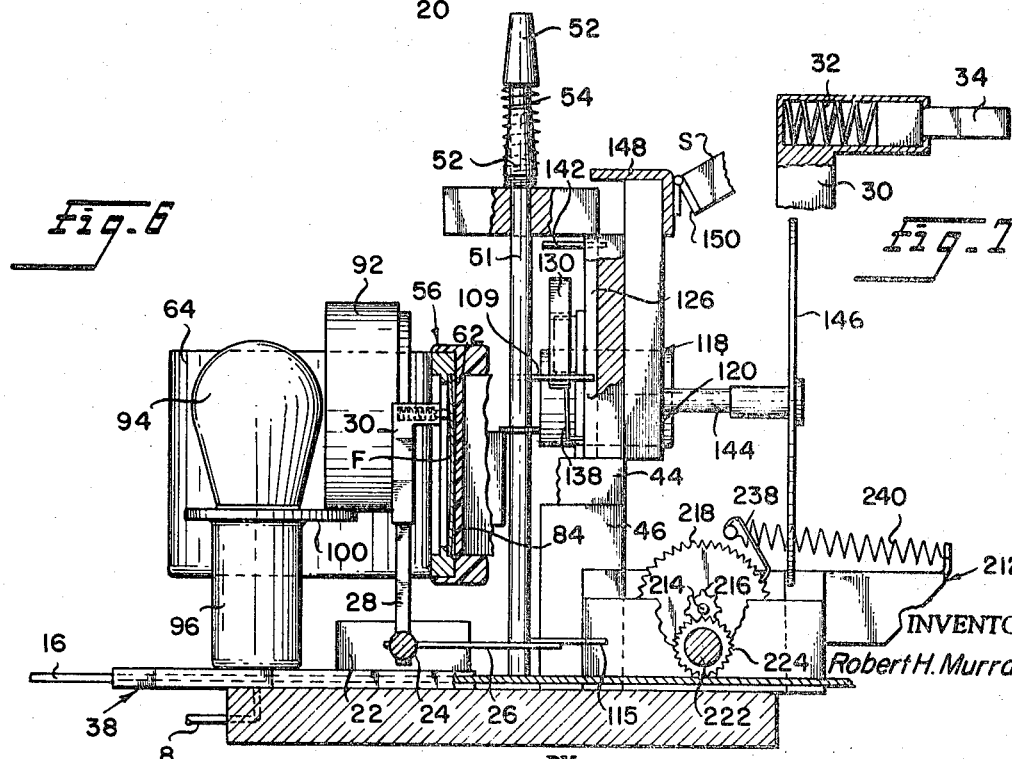

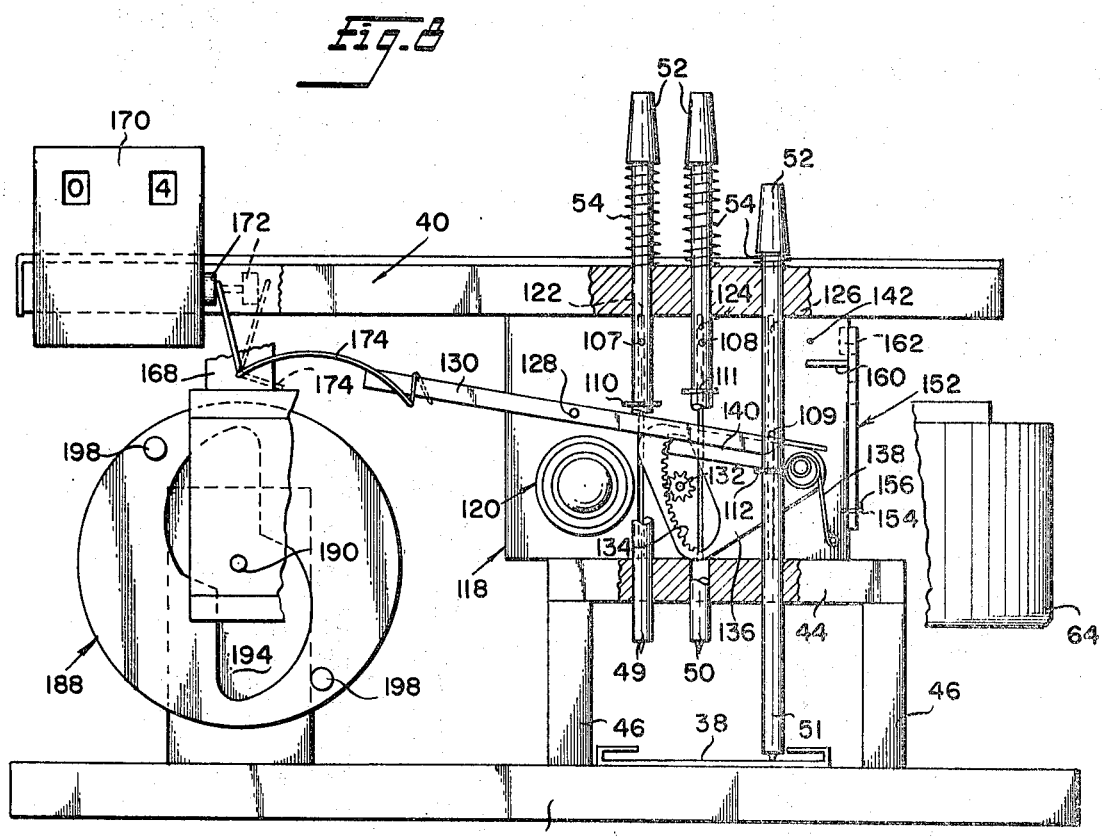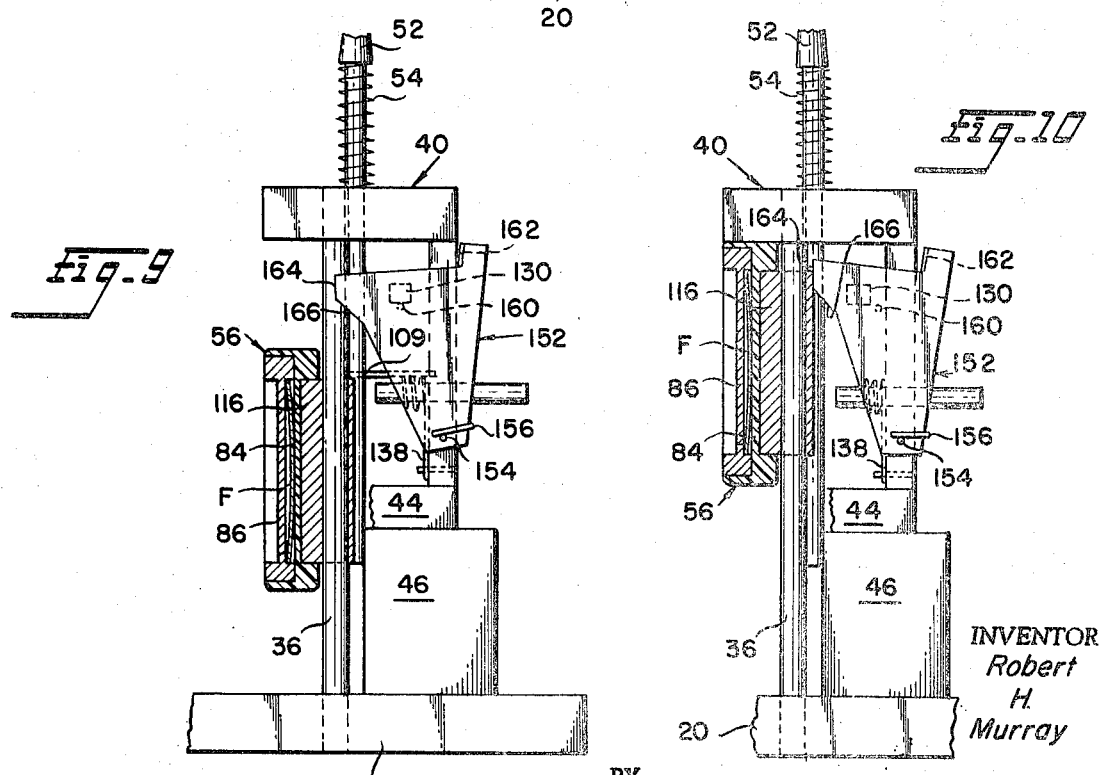

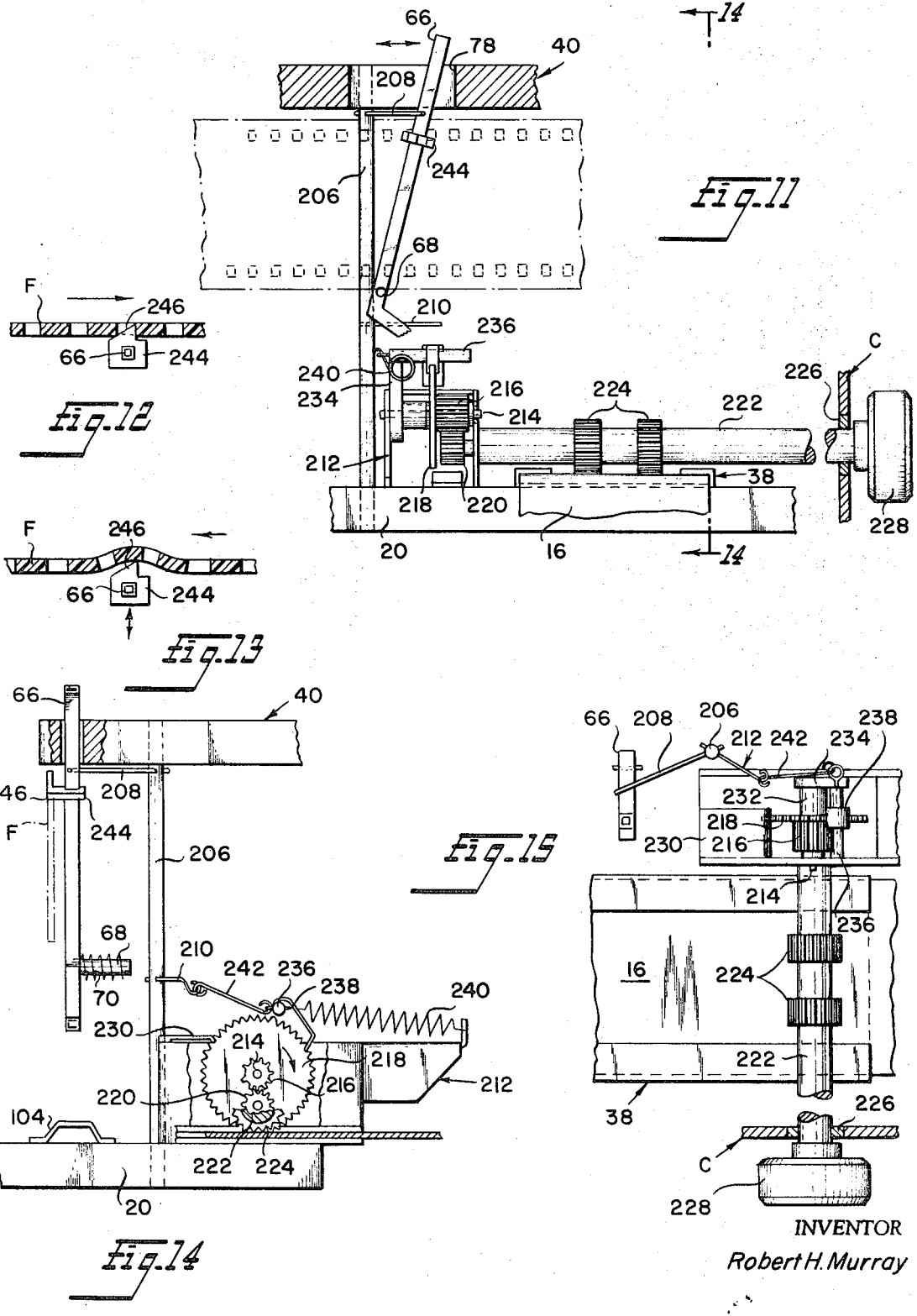

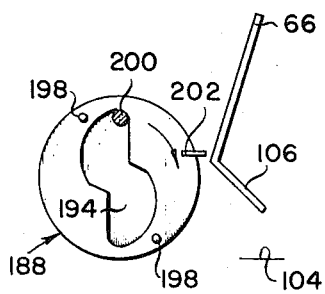
FIG. 16A
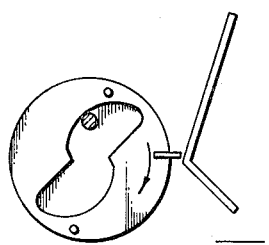
FIG. 16B
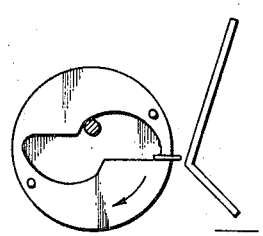
FIG. 16C
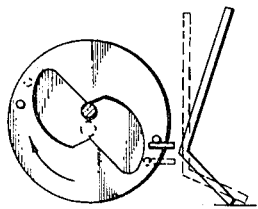
FIG. 16D
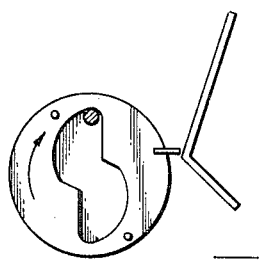
FIG. 16E
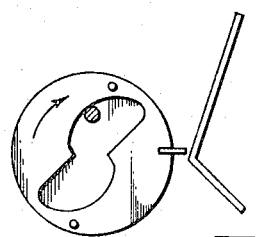
FIG. 16F
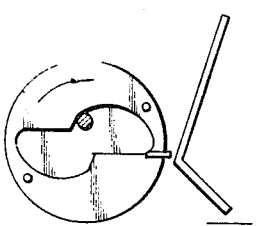
FIG. 16G
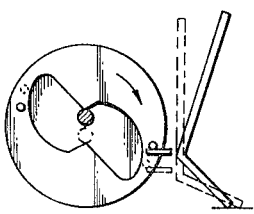
FIG. 16H
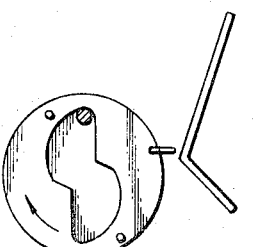
FIG. 16I
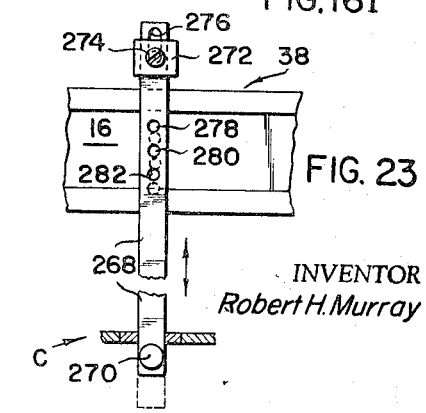

Dec. 1, 1970  R. H. MURRAY  3,543,417
FILMED PROGRAMMED TEACHING MACHINES AND THE LIKE
Filed March 8, 1968  7 Sheets-Sheet 7
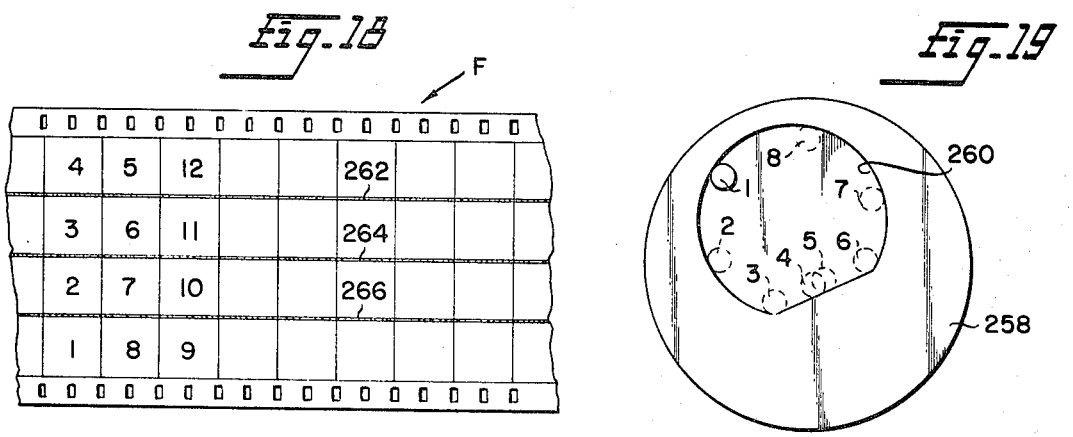
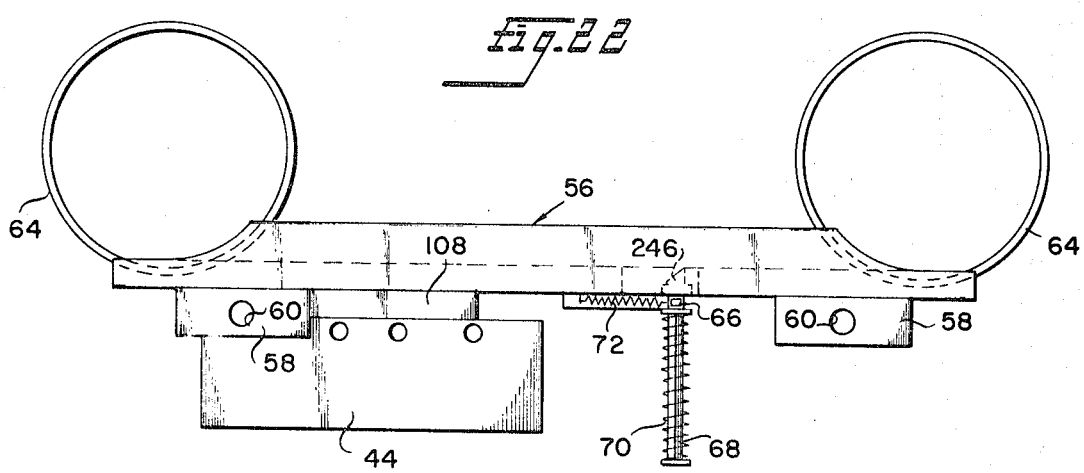
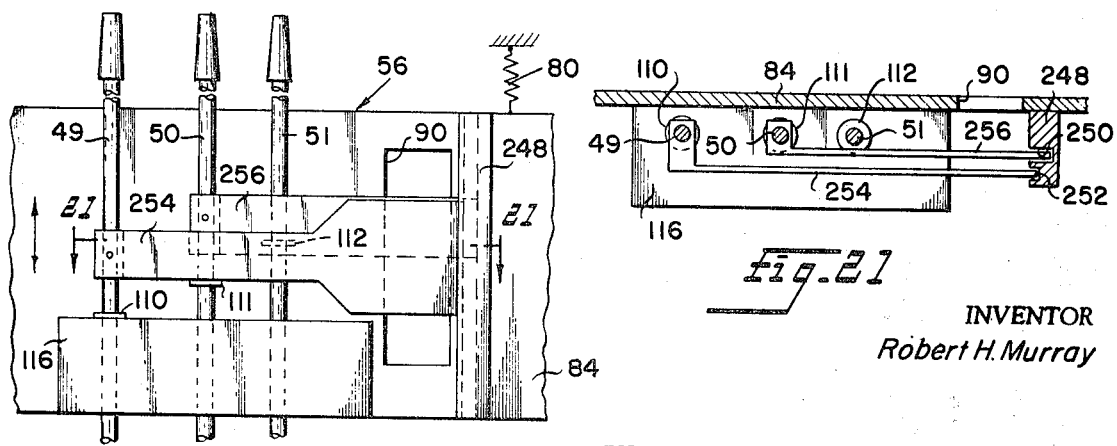
INVENTOR
Robert H. Murray
BY
Shlesinger, Arkwright & Garvey
ATTORNEYS

United States Patent Office 3,543,417
Patented Dec. 1, 1970

3,543,417
FILMED PROGRAMMED TEACHING MACHINES AND THE LIKE
Robert H. Murray, 2412 Lancaster Court, Falls Church, Va. 22043
Filed Mar. 8, 1968, Ser. No. 711,798
Int. Cl. G09b 3/06
U.S. Cl. 35—9      37 Claims

ABSTRACT OF THE DISCLOSURE

A filmed programmed teaching machine including a projecting lens system; first means for advancing film in a first direction past the lens system; second means for advancing film in a second direction past the lens system; scoring means associated with said first means for making a record; and means associated with said second means for advancing the record.

HISTORY AND DEVELOPMENT

In general, the available teaching machines are designed so as to present only one specific informational system. Furthermore, most scoring systems are not flexible enough to adapt for various different types of instructional material.

OBJECTS AND SUMMARY

It is an object of this invention therefore to provide a low cost teaching machine which has great versatility for various types of informational systems.

Another object of this invention is to provide a machine which prevents cheating on the part of the student utilizing the same.

Yet a further object of this invention is to provide a machine which provides for scoring of test information handled by the machine.

A further object of this invention is to provide a plurality of scoring devices so that one device may check the accuracy of another device for the purpose of obtaining better scoring information.

Another object of this invention is to provide a teaching machine which is compact and portable and readily stored.

A further object of this invention is to provide a teaching machine which allows the student to progress at his own rate of learning ability.

These and other objects and advantages of this invention will be apparent from a reading of the following description and claims.

In the accompanying drawings which illustrate by way of example various embodiments of this invention:

FIG. 1 is a perspective view of the invention mounted within a carying case with the lid raised;

FIG. 2 is a perspective view showing the case with the lid closed;

FIG. 3 is a side elevational view of the invention portions broken away and shown in phantom lines, as viewed from the projecting lamp side;

FIG. 4 is a side elevational view of the invention portions broken away and in phantom lines as viewed from the other side from the lamp;

FIG. 5 is a cross-sectional view taken along the lines 5—5 as illustrated in FIG. 4 and viewed in the direction of the arrows with the plungers and film carriage in raised position;

FIG. 6 is a cross-sectional view similar to FIG. 5 with the plunger and carriage in lowered position;

FIG. 7 is an enlarged fragmentary view illustrating the carrier head of the magnetic wiping device of the invention;

FIG. 8 is a side elevational view partially shown in cross section with portions of the apparatus removed to illustrate more clearly certain aspects of the invention;

FIGS. 9 and 10 are fragmentary side elevational views illustrating the lock out mechanism of the invention;

FIG. 11 is a fragmentary side elevational view with portions of the device for purposes of clarity to illustrate the film feed and score sheet feed mechanism;

FIGS. 12 and 13 are fragmentary cross-sectional views of the film strip and the film indexing pawl finger showing the advancing of the film and the by-pass of the film respectively;

FIG. 14 is a cross-sectional fragmentary view taken along the lines 14—14 of FIG. 11 and viewed in the direction of the arrows;

FIG. 15 is a top plan of that portion of the invention illustrating the scoring sheet feed mechanism;

FIG. 16 is a step by step schematic illustrating the various positions of the cam operating mechanism for the film advance;

FIG. 17 is a fragmentary plan view illustrating a particular type of "item," "answer," and "question" arrangement used in this invention;

FIG. 18 is a fragmentary plan view of a particular film strip including specific arrangements of the information on the film strip and magnetic scoring lines;

FIG. 19 is a circular cam mechanism which can be applied to the invention for the purposes of operating the machine to handle film of the type illustrated in FIG. 18;

FIG. 20 is a fragmentary side elevational view illustrating another embodiment of the shutter mechanism available for this invention;

FIG. 21 is a cross sectional view of the embodiment illustrated along the lines 21—21 of FIG. 20 and viewed in the direction of the arrows;

FIG. 22 is a top plan view of the machine with portions removed so that the interior can be plainly observed;

FIG. 23 is a fragmentary top plan view illustrating means to prevent marking of the score sheet.

When the machine M is not in use, the shades or curtains 2 may be removed or folded into the carrying case and the screen laid flat. A handle 10 is provided on the top of the case C as well as the usual locking mechanism 12.

Figure 2:
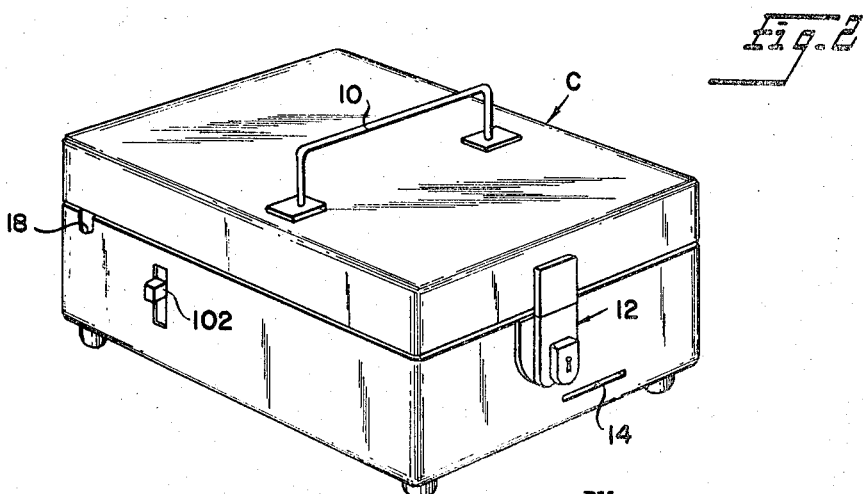

The case is provided with a slot 14 as best illustrated in FIG. 2 for receiving the scoring sheet 16. A slot 18 is provided for the cord 8 which is stored within the case when not in use.

The machine in general incorporates a film feed mechanism, a score sheet feed mechanism, a scoring mechanism, and an optical projecting system. FIGS. 3, 4, 5 and 6 particularly show the systems in detail.

The base 20 includes a pair of journal blocks 22. A shaft 24 is mounted for rotation in the journal blocks 22. A rocker member or treadle 26 is secured to the shaft 24 in the manner best illustrated in FIG. 3. A magnetic wiper arm 28 is also mounted on the shaft 24 for rocking action. The magnetic wiper arm 28 is provided with a head 30 containing a spring 32 biasing a magnetic wiper 34.

Set into or otherwise connected to the base 20 are a pair of support posts 36.

The base 20 includes a scoring sheet guard member 38 for receiving and guiding the scoring sheet 16.

The supporting posts 36 which have one end mounted in the base 20 serve as legs to support a platform member 40. The platform member 40 is provided with a series of openings 42. A cross bar member 44 having supports 46 which are secured to the base 20 is located directly beneath the openings 42 and has corresponding openings or holes 48. A series of plungers 49, 50 and 51 are mounted for reciprocation in corresponding holes 42 and 48. The openings 42 and 48 act as bearing sleeves for plungers 49, 50 and 51. The plungers 49, 50 and 51 are provided with caps 52 and are maintained in non-operating position by springs 54.

A film carrier 56 as best illustrated in FIG. 22 is provided with a pair of guide blocks 58 having holes 60. The guide blocks 58 are slidably mounted on the posts 36. As best illustrated in FIG. 5, the carrier 56 is provided with top and bottom grooves 62 or tracks which support the film F. The film F when inserted into the tracks 62 has a slight bow for reasons hereinafter described. At either end of the film carrier 56, are disposed film holders 64. The film is fed from one holder 64 to the other holder 64. Mounted on the carrier 56 at the bottom thereof is a film shift lever 66 best illustrated in FIG. 3. The lever 66 is mounted on the carrier 56 by means of an elongated pin 68 as best illustrated in FIG. 22. A captive spring 70 maintains a pressure on the shift lever 66 against the carrier 56. A return spring 72 is secured to the upper portion of the lever 66, and to the bottom of the carrier as at 74 and 76 respectively as illustrated in FIG. 4. A slot 78 is provided in the platform member 40. The upper portion of the lever 66 projects through the slot 78 as illustrated in FIGS. 3 and 4. Tension springs 80, as best illustrated in FIG. 4, are provided at either side of the assembly and connect the carrier 56 to the platform member 40 by means of eyelets 82. The spring members 80 maintain the carrier 56 normally at the top of the posts 36 and in abutting relation with the platform member 40.

The film carrier 56 as best illustrated in FIG. 5 is provided with a backplate 84 and a frontplate 86 as best illustrated in FIGS. 9 and 10. The film travels in the grooves 62 formed between the backplate 84 and the frontplate 86. A slot 88, as best illustrated in FIG. 3, is provided in the frontplate 86. The slot 88 permits the magnetic wiper 34 to strike the film F for purposes of scoring or marking the magnetic tape on the film.

An optical window 90 is provided in the carrier 56 by removing portions of both the backplate 84 and the frontplate 86. The window is aligned with the optical unit 92 as best illustrated in FIGS. 5 and 6. The optical unit is positioned in front of a lamp 94 which is mounted in a receptacle 96 mounted on the base 20. The optical unit 92 is supported in front of the lamp 94 by a plate 100 on the receptacle 96. The receptacle 96 is electrically connected to the cord 8.

Figure 1:
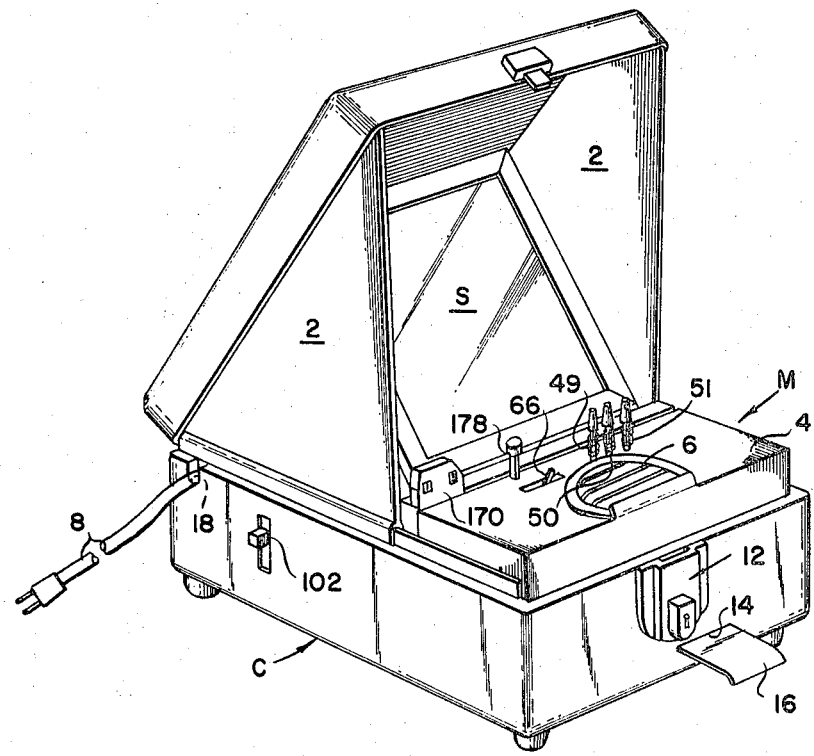
FIG. 1 shows a case C for carrying the teaching machine. The machine M is mounted within the case C. A machine M is provided with a projecting lens system as will be hereinafter described for projecting an image onto the screen S. Side curtains 2 are provided to increase the intensity of the image projected on the screen S. The housing 4 is provided with a ventilator to permit cooling of the lamp system of the projector. An electrical cord 8 is provided for the purpose of connecting the machine to any convenient electrical outlet.

Means such as switch button 102, as best illustrated in FIGS. 1 and 2, is provided for turning the lamp 94 on and off. Mounted on the base 20 is a spring cushioned plate 104 against which the angled portion 106 of the lever 66 abuts when the carriage 56 is moved to its lowermost position on the posts 36 to permit shifting of the film to the next frame in linear sequence. The spring plate 104 allows for variation in travel, wear, take-up and the like.

Plungers 49, 50 and 51 are provided with pins 107, 108 and 109 respectively. Pin 109 is shown in FIGS. 5 and 6 in two different positions. Plungers 49, 50 and 51 are also provided with push plates 110, 111 and 112 respectively as best illustrated in FIGS. 3 and 4. Plungers 49, 50 and 51 at the bottom thereof include an additional set of pins 113, 114 and 115 respectively. FIGS. 5 and 6 show first and second positions for push plate 112 and first and second positions for pin 115 respectively on the plunger 51. On the back of the carrier 56 is mounted a push block 116 which can be seen in broken lines in FIG. 4 and is shown in two positions in FIGS. 5 and 6. Push plates 110, 111, and 112 engage the push block 116 on downward push of the plungers 49, 50 and 51 so as to shift the carriage in a downwardly direction in a manner hereinafter described.

Pins 113, 114, and 115 engage the treadle or rocker 26 as best illustrated in FIGS. 5 and 6.

Secured to platform 40 is a lens support plate 118 which supports a lens unit 120. Slots 122, 124 and 126 as best seen in FIG. 8 are provided to maintain and guide pins 107, 108 and 109 which are mounted on the plungers 49, 50 and 51 respectively. The slot 126 is illustrated in FIGS. 5 and 6 showing pin 109 in two different positions in the slot. Mounted on the lens support plate 118 by a pivot pin 128 is a rocker bar 130. As best illustrated in FIG. 8, a pinion which is also mounted on the lens support plate 118 engages the teeth 134 of an escapement member 136. The escapement member 136 is biased by a spring in an upwardly direction. The escapement carries a pressure foot 140 which is urged by the spring member 138 against the bottom of the rocker bar 130. A stop pin 142 as illustrated in FIG. 8 is provided to limit the upward travel of the rocker bar 130.

It will now be obvious from a view of FIGS. 5, 6, and 8 that the pins 107, 108 and 109 on the plungers 49, 50 and 51 engage the rocker bar 130 at various points thereon to pivot it downwardly about the pin 128. The pinion 132 is mounted on a shaft 144 which extends through the lens support plate 118. A bearing sleeve (not shown) may be provided for ease in rotation of the shaft with the bearing sleeve being mounted in a hole in the lens support plate 118. Secured to the shaft 144 on the other side of the support plate 118 is a shutter segment member 146. The shutter member 146 rotates upon depression of the rocker bar 130. The portion which has been removed from the segment is positioned to permit light to travel only at selected times during operation of the system. At other times, the light through the lens system is blocked for purposes hereinafter described. As best illustrated in FIG. 5, a bracket 148 is secured to the lens support plate 118 which in turn is secured to the platform member 40. The bracket 148 is provided with a hinge 150 which in turn supports the screen or viewing plate S. Various mirror arrangements well known in the art (not shown) may be used within the case C for directing the light through the various lens systems to the screen S. The lens system itself and the various mirror systems and screen arrangements do not form a part of this invention.

As best illustrated in FIGS. 9 and 10, a lockout pawl member 152 is mounted on a pivot pin 154 set into the edge of the lens support plate 118. A spring 156 biases the lockout pawl member 152 in a counterclockwise direction as illustrated in FIG. 9. The spring member 156 as best illustrated in FIG. 4, is secured to the back of the lens support plate 118 at a point 158. This permits a constant spring pressure to be maintained against the pawl member 152. Mounted on the pawl member 152 is a lockout pin 160. A limit stop 162 is provided on the lockout pawl member 152 to prevent the lockout pawl member from shifting too far to the left. This is best illustrated in FIGS. 8, 9 and 10. The limit stop 162 is a dog bent inwardly from the plane of the lockout pawl member 152.

The lockout pawl 152 is provided with cam surfaces 164, 166. Upon downward travel of the carrier 56, cam surface 164 rides on the back of the carrier. As the carrier drops down further, cam surface 166 allows the lockout pawl member 152 to travel forwardly and to bring the pin 160 into position beneath the rocker bar 130 thereby to prevent its downward travel if operated by one of the pins 107, 108 and 109. This makes the plunger members 49, 50 and 51 inoperative for reasons hereinafter explained.

Mounted on the platform 40 as best illustrated in FIG. 8 is a spring support bracket 168. Mounted to the left of the spring support bracket is a counter 170 having a push button 172 which is shown in FIG. 8 in the in position. The shade lines show the out position. A spring member 174 engages the rocker bar 130 and is supported by the bracket 168 and engages the push button 172 of the counter 170. With each depression of the rocker bar 130, the counter operates to record the number of depressions. The counter mechanism is again shown in FIG. 4 in the out position. Mounted in the platform member 40 is a bearing sleeve 176 best seen in FIGS. 3 and 4. A plunger 178 is provided with a button cap 180. The plunger reciprocates in the sleeve 176 and has at its lower end a spring pressure foot 182. The plunger 178 is maintained in raised position by means of a spring member 184.

Supported on base 20 is a bracket plate 186 as best illustrated in FIG. 4. A rotary cam and pawl member 188 is rotatably mounted on an axle 190. The rotary cam and pawl member is disk shaped and the back portion as best illustrated in FIG. 4 includes a series of pawl teeth 192. The front portion is provided with a cam recessed area 194 having a continuous cam surface 196. Mounted on the front surface adjacent the cam recessed area 194 are a pair of opposed pins 198. The cam surface 196 collaborates with a pin 200 mounted on the carrier 56. The pin 200 engages the cam surface 196. As best illustrated in FIGS. 3 and 4, a stop member 202 projects outwardly from the back plate 84 of the carrier member 56. The stop 202 projects far enough to be engaged by the pins 198 on the rotary cam and pawl member 188.

The pressure foot 182 of the plunger 178 engages the pawl teeth 192 in sequence. A spring stop member 204 prevents counter rotation of the cam and pawl member 188 so that the member 188 will always move in one direction only as illustrated by the directional arrows in FIGS. 3 and 4.

As best illustrated in FIG. 14, a rotary shaft 206 is provided with a pin 208 which is spring-biased against the lever 66. A second pin 210 is fixed to the shaft 206. Mounted on the base 20 is a housing 212 which supports a shaft 214 on which is journaled a drive pinion 216 and a rachet wheel 218. The drive pinion 216 drives a driven pinion 220 which in turn drives a shaft 222 having mounted thereon friction bands 224 which engage the scoring sheet 16 in the scoring sheet guide member 38. The shaft 222 projects through a bearing sleeve 226 in the wall of the case C. A knob 228 is provided for manually moving the sheet 16. The housing 212 is provided with a pawl stop spring 230 which engages the rachet wheel 218, as best illustrated in FIGS. 11, 14 and 15. Mounted on the drive shaft 214 is a sleeve 232. A crank arm 234 extends from the sleeve 232 and is provided with a crank pin 236 to which is secured a pawl feed finger 238. A spring 240 secured to the housing 212 is connected to the pin 236. A link 242 connects the pin 236 to the pin 210. A film shift lever 66 is provided with a dog 244 as best illustrated in FIGS. 12 and 13 having a pawl finger 246. When the film shift lever 66 is shifted to the right as in FIG. 15, it engages pin 208 to rotate shaft 206 which in turn rotates 210 to pull link 242 and thus to move crank pin 236 so as to move the pawl feed finger 238 over the teeth of the ratchet wheel 218. The pawl stop spring 230 maintains the rachet wheel in position against forward movement which might be initiated by the pawl feed finger 238. When the lever 66 returns to its original position, the spring 240 pulls the crank pin to its original position causing the feed finger 238 to engage one of the rachets of the rachet wheel 218 and thus to rotate the wheel 218 which in turn drives the shaft 214 which drives the drive pinion 216 which in turn drives the driven pinion 220 which in turn drives the shaft 222 and causes the scoring sheet 16 to be moved forward because of the frictional engagement of the friction bands 224 rotating on the shaft 222. The knob 228 may be used manually to feed the score sheet 16 as will be obvious.

The pawl finger 246 on the dog 244 is so designed that it will pick up the film when moving in one direction and by-pass the film when moving in the other direction. The film as illustrated in FIG. 13 bows out of the way when the dog 244 moves to the left. Because of the spring member 70 on the pin 68, some displacement will take place as indicated by the arrows in FIG. 13 of the film shift lever 66.

ALTERNATE SHUTTER ARRANGEMENT

Referring now to FIGS. 20 and 21, the back plate member 84 of the film carrier 56 is provided with a guide bracket 248. The guide bracket 248 is provided with slots 250 and 252. Secured to the shafts of plungers 49 and 50 are a pair of shutters 254 and 256. The far end of the shutters travel in the slots 252 and 250 respectively.

The purpose of the shutters 254 and 256 is to provide visual inspection only of that portion of the film involved with that particular plunger depressed.

CAM SEQUENCE

In FIG. 16, we illustrate the cam sequence operation. For purposes of illustration, the parts are shown merely in spaced relation. Member 202 is normally mounted on the carrier 56 and the lever 66 with its arm 106 is also mounted on the carrier 56. The cam and pawl member 188 is mounted on a bracket plate 186 on the base and secured to the base 20.

In A, the pin 200 which is mounted on the carrier 56 is in the upper portion of the cam recess 194. The carrier is in its uppermost position. This is best illustrated in A.

Upon depression of the plunger 178, the pressure foot 182 will engage the pawl teeth 192 and shift them one increment to the position illustrated in B. Because of the spring stop 204, the carrier which is now under spring tension by the springs 80 will not be able to return to its top position but will remain in the position illustrated at B. This introduces a new frame into the optical system for projection purposes.

Upon a second depression of the plunger 178, the pin 200 will now move to the position illustrated at C and remain there for reasons previously mentioned. Note now the position of the film feed lever 66. It is coming downward toward the member 104. We now have a new frame in projecting position which would be the third frame up from the bottom of the film. It will be obvious that additional frames can be provided by increasing the number of stepping operations which can be performed by the plunger 178.

Shifting now to D which is the fourth position, we note that pin 198 which has been gradually rotating clockwise, now comes into engagement with the stop 202 on the carrier 56, so that the next stroke of plunger 178 will force the carrier down an additional increment so that it will engage with the cushion plate 104 to thus cause the film shift lever to automatically rock about its pivot and thus to shift the film automatically to the next frame. Once the pin 198 has moved out of engagement with the stop 202, the carrier is now free to return to its upper position to start a second sequence of frames in the manner illustrated in E, F, G and H with the other half of the cam surface 196. Thus for a single revolution of the member 188, the film is shifted twice longitudinally and two separate lateral sets of frames are viewed. The position illustrated in I is identical with the position illustrated in A, starting the sequence over again. Plunger 178 will not cause advance of the score sheet 16 as the film feed lever 66 will be out of engagement with the pin 208 during depression.

Considering now the film illustrated in FIG. 17, it will be obvious that with the cam 188, twelve frames of informational film can be presented in the order illustrated with a series of questions and answers. Selection of one of the answers can be done selectively for scoring purposes as will hereinafter be described. It will be obvious that the lateral displacement of information can include many more frames than four transversely on the film for reasons mentioned above.

FIG. 18 illustrates how the film F will be provided with information which runs in step fashion transversely of the film and returns in step fashion transversely of the film. For this purpose, the cam and pawl member 258 will have a cam track 260 designed as illustrated in FIG. 19. It is obvious that other types of cam track arrangements can be designed for projecting different sequences of information on film which has frames which are specially arranged. The film in FIG. 18 is provided with magnetic strips 262, 264 and 266 to which a signal has been applied which can be wiped and thus scored by the magnetic wiper 34 on the wiper arm 28. The film can be scored by running through a machine which will make a note of the wiped out areas on the film stripes and tabulate the same according to stripe and number and position.

SCORING DEVICES

It will be obvious that various scoring devices can be adapted for use with the plunger 49, 50 and 51. It will also be obvious that many additional plungers can be utilized. It is contemplated that the bottom of the plunger may include a pencil or ink marking device, a magnetic marking device, and punch device, an impression device, or any other type of marking instrument or combination of these instruments. It might be desirable to both punch and visually mark to permit the information to be scored by two different types of systems.

REVIEW OF MACHINE OPERATION

In operation of the machine, the film presented will contain a series of informational frames arranged transversely across the film strip and in longitudinal sequence the entire length of the viewable film. The film will be placed in the film holder on the right as viewed in FIG. 3, and will be fed into the film holder 64 on the left. The film will initially be fed manually and enough leader will be provided until the film can be fed by means of the film shift lever 66. When the first informational frame has been projected upon the screen, the operator will then index the frames by means of the plunger 178 until the last frame of a sequence is shown. If a question is presented upon the screen, the student can respond by depressing any one of the scoring plungers 49, 50 and 51, and at this time the score sheet 16 will be marked by the marking devices (not specifically shown) in the plungers 49, 50 and 51.

If it is desired that the plungers 49, 50 and 51 be used for purposes of viewing the various frames optionally, it will then be necessary to modify the plungers so that they will not score when depressed until such time as desired. This can be done by any mechanical means such as means for moving the marking end of the plunger within the plunger barrel similar to the way in which lead is retracted into a lead pencil or a ball point on a ball point pen is retracted within the pen tube. Another method of preventing scoring is illustrated in FIG. 23. In this instance, the score sheet 16 carried by the scoring sheet guide member 38 travels beneath a guard cover 268. The guard cover is provided with a handle 270 extending outside of the case C. A bracket 272 having a set screw 274 is provided. The set screw passes through a slot 276 in the guard cover 268. Openings 278, 280 and 282 are provided in the guard cover. In the position shown, the openings are in a position to permit the marking devices on the plungers to engage the scoring sheet 16. If the handle 270 is pulled outwardly to the dotted line position shown, the openings will be shifted so as to bring portions of the guard cover directly beneath the plungers and thus prevent the plungers from engaging with the score sheet 16.

It will now be obvious that the film can be shifted at any time that the carrier 56 is at its top position since the film shift lever 66 will project through the slot 78. At any other time that the carrier is in a lowered position, the film advance will not be manually possible by the film shift lever but can only be done by actuation of the plunger 178 through its sequence as described heretofore.

In marking by means of the magnetic wiper 34, the rocking action is sufficient to permit a wiping motion on the film strip so that the magnetic device will be moved across the surface of the film and across the magnetic stripe laid down thereon so as to cause a noticeable change in the signal imposed on the strip.

The lockout member 152 is designed to prevent the student from operating any of the plunger members 49, 50 and 51 once the carriage has been shifted downwardly by means of the plunger 178. This prevents cheating by use of plunger 178 in question and answer sequences. With the multiple scoring devices, comparison of information between the various scoring devices such as the counter, and the magnetic scoring device, and the punch or marking device will provide useful information to the instructor for correction purposes.

When the carriage 56 is in its top position, any one of the plunger mechanisms may be operated to score or not to score depending upon the position of the guard or the type of scoring device used as heretofore indicated. Selection and review of various frames is permitted since there is no lock out by the lockout member 152. Depression of any individual plunger 49, 50 or 51 will start the rocker bar 130 moving to a position beneath the pin 160 before the carrier 56 is low enough to permit the lock out member 152 to move forward to a position where the pin 160 would normally be directly under the rocker arm 130.

The primary purpose of the shutter mechanism is to prevent the student from viewing intervening frames which would be brought into position and particularly that plunger which will traverse all of the frames enabling the student to see each frame as it passes across the optical system and thus have an opportunity to cheat the machine if the shutter system were not present.

It will be obvious that this machine can be used with audio equipment and that the machine can be adapted for sound track pick-up. While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth as fall within the scope of the invention or the limits of the appended claims.

Having thus described my invention, what I claim is:
1. A film programmed teaching machine including:
 (a) a projecting lens system,
 (b) first means for advancing film in a first direction past said lens system,
 (c) second means for advancing film in a second direction transverse to said first direction past said lens system,
 (d) scoring means associated with said first means for making a record, and
 (e) means associated with said second means for advancing said record.

2. A film programmed teaching machine as in claim 1 and wherein:
 (a) said first means for advancing said film includes a plurality of film shifters, and
 (b) each of said film shifters each including means for advancing said film a distance different from said other film shifters.

3. A film programmed teaching machine as in claim 2 and wherein:
(a) said film shifters include a plurality of plungers, and
(b) said plungers each include said means for making a record.

4. A film programmed teaching machine as in claim 3 and wherein:
(a) said scoring means comprises a marking device associated with each plunger.

5. A film programmed teaching machine as in claim 1 and wherein:
(a) said first means for advancing said film includes a reciprocable carriage, and
(b) means for selectively moving said carriage at least two different distances.

6. A film programmed teaching machine as in claim 5 and wherein:
(a) said means for selectively moving said carriage includes a plurality of plungers,
(b) each of said plungers including a stop for engaging said carriage,
(c) said stops positioned on said plungers at different distances from the top of said plungers so that each plunger moves said carriage selectively a different distance.

7. A film programmed teaching machine as in claim 6 and wherein:
(a) said plungers include said scoring means for making a record.

8. A film programmed teaching machine as in claim 1 and wherein:
(a) said first means for advancing said film includes a plurality of film shifters, and
(b) at least one of said film shifters includes said scoring means for making a record.

9. A film programmed teaching machine as in claim 1 and wherein:
(a) said first means for advancing said film includes a reciprocable carriage and first and second operator means for said carriage,
(b) said first operator means including a single plunger means for moving said carriage in step-by-step sequences,
(c) said second operator means including a plurality of carirage shifters.

10. A film programmed teaching machine as in claim 9 and wherein:
(a) said shifters each include said scoring means for making a record.

11. A film programmed teaching machine as in claim 10 and wherein:
(a) said first operator means includes a cam operator associated with said single plunger means.

12. A film programmed teaching machine as in claim 2 and including:
(a) shutter means for said projecting lens system, and wherein
(b) said film shifters include means for controlling said shutter means.

13. A film programmed teaching machine as in claim 12 and wherein:
(a) said shutter means includes a rotating shutter for said projecting lens system.

14. A film programming teaching machine as in claim 13 and wherein:
(a) said means for controlling said shutter means includes a gear drive.

15. A film programmed teaching machine as in claim 12 and wherein:
(a) said shutter means includes reciprocating blade means.

16. A film programmed teaching machine as in claim 15 and wherein:
(a) said reciprocating blade means is fixedly secured to at least one of said film shifters.

17. A film programmed teaching machine as in claim 9 and including:
(a) shutter means for said projecting lens system and wherein:
(b) said shutter means includes reciprocating blade means,
(c) said blade means including at least one blade less than the number of carriage shifters.

18. A film programmed teaching machine as in claim 1 and wherein:
(a) said second means for advancing film includes a film shift lever.

19. A film programmed teaching machine as in claim 18, and wherein:
(a) said first means for advancing said film operates said film shift lever.

20. A film programmed teaching machine as in claim 19 and wherein:
(a) said film shift lever includes means for operating said film shift means independently of said first means for advancing said film.

21. A film programmed teaching machine as in claim 19 and wherein:
(a) said first means for advancing said film includes a reciprocable carriage and first and second operator means for said carriage,
(b) said first operator means including a single plunger means for moving said carriage in step-by-step sequence, and
(c) means engaging said film shift lever when said single plunger means moves said carriage to the last step of a sequence, thereby to move said film shift lever to thus advance said film.

22. A film programmed teaching machine as in claim 21 and including:
(a) means for operating said film shift lever independently of said first operator means.

22. A film programmed teaching machine as in claim 22 and wherein:
(a) said film shift lever is carried by said reciprocable carriage.

24. A film programmed teaching machine as in claim 23 and including:
(a) means connecting said film shift lever to said means for advancing said record.

25. A film programmed teaching machine as in claim 24 and wherein:
(a) said film shift lever includes a one way dog for engaging said film strip when said lever is moved in one direction and by-passing said film strip when said lever is moved in the other direction.

26. A film programmed teaching machine as in claim 24 and wherein:
(a) said means for advancing said record includes pawl and ratchet means.

27. A film programmed teaching machine as in claim 18 and including:
(a) means for shielding said film shift lever upon operation of said first and second means for advancing film.

28. A film programmed teaching machine as in claim 1 and wherein:
(a) said means for making a record includes movable magnetic scoring means,
(b) said magnetic scoring means including lever means operated by said first means for advancing film.

29. A film programmed teaching machine as in claim 28 and wherein:
(a) said first means for advancing film includes a plurality of film shifters, and
(b) each of said film shifters each including means for advancing said film a different distance from said other film shifters,
(c) said film shifters including a plurality of plungers, and (d) means on each plunger for engaging said magnetic scoring means at the bottom of the plunger stroke to move it to a scoring position.

30. A film programmed teaching machine as in claim 29 and wherein:
(a) said magnetic scoring means includes means for wiping an area of film during scoring operation so as to make a record on film having cooperating magnetic areas thereon.

31. A film programmed teaching machine as in claim 1 and including:
(a) means for making said first means for advancing film inoperable when said second means for advancing film is operated.

32. A film programmed teaching machine as in claim 2 and including:
(a) means for making the remaining of said film shifters inoperable after one of said film shifters has been operated.

33. A film programmed teaching machine as in claim 32 and including:
(a) means for making said first means for advancing film inoperable when said second means for advancing film is operated.

34. A film programmed teaching machine as in claim 33 and wherein:
(a) said first means for advancing said film and said film shifters each include an operating and non-operating position,
(b) said means for making said first means for advancing said film inoperable and the remaining of said film shifters inoperable after one of said film shifters has been operated includes a lever bar and a lever bar stop pin normally disengaged when said first means for advancing film and said film shifters are in non-operating position, and engaged when said first means for advancing film and said one of said film shifters are in operating position.

35. A film programmed teaching machine as in claim 1 and wherein:
(a) said scoring means includes a score strip holder, and
(b) pawl and ratchet means associated with said score strip holder for advancing a score strip.

36. A film programmed teaching machine as in claim 35 and wherein:
(a) said score strip holder includes a guide for feeding a score strip transverse to the feed of said film.

37. A film strip programmed teaching machine including:
(a) a projecting lens system,
(b) first means for projecting serially portions of said film strip which portions have been arranged in a first direction on said film strip,
(c) second means for projecting serially portions of said film strip which portions have been arranged in a second direction transverse to said first direction on said film strip,
(d) scoring means associated with said first means for making a record, and
(e) means associated with said second means for advancing said record.

References Cited
UNITED STATES PATENTS

| | | | |
|---|---|---|---|
| 3,229,396 | 1/1966 | Shaw | 40—86 |
| 3,284,923 | 11/1966 | Leslie | 35—8 |
| 3,408,749 | 11/1968 | Brudner | 35—9 |

WILLIAM H. GRIEB, Primary Examiner